(12) United States Patent
Kato

(10) Patent No.: US 11,990,666 B2
(45) Date of Patent: May 21, 2024

(54) RFID READER/WRITER ANTENNA DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 347 days.

(21) Appl. No.: 17/517,008

(22) Filed: Nov. 2, 2021

(65) Prior Publication Data
US 2022/0059924 A1 Feb. 24, 2022

Related U.S. Application Data

(63) Continuation of application No. PCT/JP2020/021191, filed on May 28, 2020.

(30) Foreign Application Priority Data

Oct. 24, 2019 (JP) ................. 2019-193116

(51) Int. Cl.
*H01Q 1/22* (2006.01)
*G06K 19/077* (2006.01)
(Continued)

(52) U.S. Cl.
CPC ..... *H01Q 1/2216* (2013.01); *G06K 19/07773* (2013.01); *H01Q 1/38* (2013.01); *H01Q 13/206* (2013.01)

(58) Field of Classification Search
CPC ...... H01Q 1/2216; H01Q 1/38; H01Q 13/206; H01Q 9/42; H01Q 21/293; G06K 19/07773
See application file for complete search history.

(56) References Cited

U.S. PATENT DOCUMENTS

| 4,213,133 A * | 7/1980 | Hidaka | H01Q 3/26 |
| | | | 342/350 |
| 5,148,130 A * | 9/1992 | Dietrich | H03H 7/42 |
| | | | 333/25 |

(Continued)

FOREIGN PATENT DOCUMENTS

| JP | 2002152115 A | 5/2002 |
| JP | 2010165150 A | 7/2010 |
| JP | 2011097455 A | 5/2011 |

OTHER PUBLICATIONS

International Search Report issued for PCT/JP2020/021191, dated Sep. 1, 2020.

(Continued)

*Primary Examiner* — Curtis J King
(74) *Attorney, Agent, or Firm* — ArentFox Schiff LLP

(57) ABSTRACT

An RFID reader/writer antenna device is provided that includes a first radiating element, a second radiating element, a third radiating element, baluns, a phase shifter, and a distributor. The radiating elements each comprise conductor patterns with extending directions that are parallel to each other, and used for reading or writing of RFID tags. The distributor connects the first radiating element, the second radiating element, and the third radiating element to a common input/output. The phase shifter causes a feeding phase of the second radiating element and feeding phases of the first radiating element and the third radiating element to have a phase difference of 90°. The baluns perform conversion between a balanced signal and an unbalanced signal.

19 Claims, 14 Drawing Sheets

(51) Int. Cl.
    *H01Q 1/38*     (2006.01)
    *H01Q 13/20*     (2006.01)

(56) References Cited

U.S. PATENT DOCUMENTS

| | | | | |
|---|---|---|---|---|
| 7,054,296 B1* | 5/2006 | Sorrells | H04B 1/406 | 370/480 |
| 7,170,395 B2* | 1/2007 | Crenshaw | H04B 3/56 | 340/310.18 |
| 7,265,675 B1* | 9/2007 | Carrender | H01Q 1/2216 | 340/572.7 |
| 7,283,793 B1* | 10/2007 | McKay | H04B 1/0458 | 333/25 |
| 7,353,997 B2* | 4/2008 | Tikhov | G06K 19/0672 | 235/462.01 |
| 7,439,928 B2* | 10/2008 | Forster | G06K 19/07758 | 343/895 |
| 7,825,867 B2* | 11/2010 | Tuttle | H01Q 21/24 | 343/758 |
| 7,936,268 B2* | 5/2011 | Tuttle | H01Q 1/2225 | 340/572.1 |
| 8,115,637 B2* | 2/2012 | Tuttle | G06K 19/07773 | 340/572.7 |
| 10,025,960 B1* | 7/2018 | Fink | H04L 5/08 | |
| 10,419,039 B2* | 9/2019 | Hanaoka | H04B 1/50 | |
| 2002/0014986 A1* | 2/2002 | Ringwald | G01S 13/767 | 342/51 |
| 2002/0058483 A1 | 5/2002 | Shinichi et al. | | |
| 2002/0126019 A1* | 9/2002 | Tatsumi | H03D 9/0633 | 340/1.1 |
| 2007/0046552 A1* | 3/2007 | Marino | H01Q 1/44 | 340/572.1 |
| 2007/0132591 A1* | 6/2007 | Khatri | H01Q 1/2208 | 340/572.1 |
| 2007/0152830 A1* | 7/2007 | Burr | H01Q 1/2216 | 340/572.7 |
| 2007/0152831 A1* | 7/2007 | Eisele | H01Q 1/2225 | 340/572.7 |
| 2007/0194886 A1* | 8/2007 | Bang | H04B 1/525 | 340/572.1 |
| 2007/0194929 A1* | 8/2007 | Wagner | H01Q 21/24 | 340/572.7 |
| 2007/0222700 A1* | 9/2007 | De Flaviis | H01Q 1/38 | 343/895 |
| 2007/0273531 A1* | 11/2007 | Ando | H01Q 3/26 | 340/572.7 |
| 2008/0061942 A1* | 3/2008 | Maniwa | G06K 7/10128 | 340/10.3 |
| 2008/0231421 A1* | 9/2008 | Tuttle | G06K 19/07749 | 340/10.1 |
| 2008/0238684 A1* | 10/2008 | Tuttle | G06K 19/07749 | 340/572.7 |
| 2008/0266192 A1* | 10/2008 | Tuttle | H01Q 21/24 | 343/756 |
| 2008/0318524 A1* | 12/2008 | Rofougaran | H01Q 1/2283 | 455/41.1 |
| 2009/0045961 A1* | 2/2009 | Chamarti | H01Q 1/38 | 340/572.7 |
| 2009/0195361 A1* | 8/2009 | Smith | H01Q 3/30 | 340/572.7 |
| 2009/0284377 A1* | 11/2009 | Tuttle | H01Q 21/28 | 340/572.7 |
| 2010/0134291 A1* | 6/2010 | Lavedas | H01Q 1/2225 | 340/572.7 |
| 2010/0148886 A1* | 6/2010 | Inoue | H03H 7/463 | 333/132 |
| 2010/0150075 A1* | 6/2010 | Inoue | H03H 9/0576 | 370/328 |
| 2010/0176924 A1 | 7/2010 | Seitz et al. | | |
| 2010/0201487 A1* | 8/2010 | Halberthal | H01Q 7/00 | 343/702 |
| 2010/0245054 A1* | 9/2010 | Kim | H04B 5/0062 | 455/41.1 |
| 2010/0277284 A1* | 11/2010 | Brown | G06K 7/10079 | 340/10.3 |
| 2010/0321166 A1* | 12/2010 | Horst | H01Q 3/24 | 340/10.51 |
| 2011/0279232 A1* | 11/2011 | Tuttle | G06K 19/07773 | 235/492 |
| 2011/0306296 A1* | 12/2011 | Takahashi | H01Q 1/2216 | 455/41.1 |
| 2011/0317594 A1* | 12/2011 | Alicot | G06K 7/10297 | 340/10.1 |
| 2012/0119884 A1* | 5/2012 | Nehrig | G06K 19/07773 | 327/63 |
| 2012/0182147 A1* | 7/2012 | Forster | H01Q 1/2225 | 340/572.7 |
| 2013/0154803 A1* | 6/2013 | Koch | H01Q 1/2216 | 340/10.1 |
| 2015/0122886 A1* | 5/2015 | Koch | H01Q 1/50 | 343/893 |
| 2016/0111770 A1* | 4/2016 | Choi | H01Q 1/523 | 343/893 |
| 2016/0180125 A1* | 6/2016 | Schuster | H03H 7/38 | 235/451 |
| 2016/0285490 A1* | 9/2016 | Hanaoka | H04B 1/16 | |
| 2016/0379462 A1* | 12/2016 | Zack | G08B 25/016 | 340/539.12 |
| 2017/0116444 A1* | 4/2017 | Karmakar | H01Q 15/0006 | |
| 2017/0200029 A1* | 7/2017 | Nikitin | H01Q 1/38 | |
| 2017/0249487 A1* | 8/2017 | Shimazaki | G08B 5/36 | |
| 2017/0249546 A1* | 8/2017 | Weisgerber | H04B 5/0062 | |
| 2018/0212692 A1* | 7/2018 | Kummetz | G06K 19/0773 | |
| 2019/0148815 A1* | 5/2019 | Aono | H01Q 1/2283 | 455/552.1 |
| 2020/0028255 A1* | 1/2020 | Kuhn | H01Q 1/526 | |
| 2020/0327782 A1* | 10/2020 | Wong | G06K 7/10881 | |
| 2021/0135365 A1* | 5/2021 | Tsutsumi | G01S 3/40 | |
| 2021/0174328 A1* | 6/2021 | Kojima | G06Q 10/087 | |
| 2021/0192156 A1* | 6/2021 | Koch | G06K 7/10346 | |
| 2021/0234616 A1* | 7/2021 | Morsy-Osman | H04B 10/67 | |
| 2022/0094514 A1* | 3/2022 | Hur | H03H 7/463 | |
| 2022/0239272 A1* | 7/2022 | Maruyama | H03H 7/48 | |
| 2023/0274107 A1* | 8/2023 | Fujii | G06K 7/10297 | 235/451 |

OTHER PUBLICATIONS

Written Opinion of the International Searching Authority issued for PCT/JP2020/021191, dated Sep. 1, 2020.

* cited by examiner

RFID READER/WRITER ANTENNA DEVICE

CROSS REFERENCE TO RELATED APPLICATIONS

The present application is a continuation of PCT/JP2020/021191 filed May 28, 2020, which claims priority to Japanese Patent Application No. 2019-193116, filed Oct. 24, 2019, the entire contents of each of which are incorporated herein by reference.

TECHNICAL FIELD

The present invention relates to an antenna device provided in a reader/writer for an RFID tag.

BACKGROUND

Japanese Patent Unexamined Publication No. 2010-165150 (hereinafter "Patent Literature 1") discloses an example of an RFID reader/writer antenna device used to write information in a plurality of RFID tags. In the RFID reader/writer antenna device described in Patent Literature 1, two linear antenna elements are formed on one surface of a rectangular substrate to have a length of ¼ of a wavelength of a write radio wave, the antenna elements are adjacently disposed in parallel, and an end portion on the same sides of the two linear antenna elements is provided with a power feeding unit. With this configuration, an electric field is generated between the two antenna elements, and the electric field is emitted to upper and lower surface directions of the substrate. As a result, when the substrate of the antenna is disposed such that a longitudinal direction thereof is directed to a direction orthogonal to a conveyance direction of the plurality of RFID tags adjacently disposed on a sheet in parallel, information can be written into each RFID tag.

The antenna device described in Patent Literature 1 solves the problem that the same data is written in the plurality of adjacent RFID tags when the reader/writer writes data in any one of the plurality of RFID tags disposed adjacent to each other in parallel on a conveyor belt, but is not suitable as an antenna device that reads the information from the plurality of RFID tags.

In a case where the data of the plurality of RFID tags is read in a state where a plurality of articles to which the RFID tags are attached overlap, there is a following problem.

Specifically, in order to perform reading and writing with one RFID reader/writer, when the plurality of articles are stacked and placed on the reading surface of the reader of the RFID reader/writer, the plurality of RFID tags inevitably come close to each other in a stacking direction. In this configuration, the RFID tags interfere with each other, and a NULL point which is a point at which data cannot be read or written occurs. That is, data cannot be read from or written to the RFID tag at the NULL point. For example, it may not be possible to read or write data of RFID tags at several heights corresponding to NULL points among the RFID tags of a large number of stacked articles.

SUMMARY OF THE INVENTION

In this regard, the present invention provides an RFID reader/writer antenna device constructed for reading and writing of RFID tags in a state where a NULL point is substantially eliminated even in a situation where a large number of articles with the RFID tags are stacked.

Accordingly, an RFID reader/writer antenna device of the present disclosure includes a plurality of radiating elements that include a first radiating element and a second radiating element. Moreover, the plurality of radiating elements are defined by conductor patterns of which extending directions are parallel to each other, and are used for reading or writing of RFID tags. A distributor is provided that connects the first radiating element and the second radiating element with a common input/output portion; and a phase shifter is provided that causes a feeding phase of the second radiating element and a feeding phase of the first radiating element to have a phase difference of 90° or 90°±10°.

According to the RFID reader/writer antenna device of the present invention, even when a large number of articles with RFID tags are stacked, reading and writing of the RFID tags can be performed in a state where a NULL point is substantially eliminated.

DETAILED DESCRIPTION OF EMBODIMENTS

Figure 1:
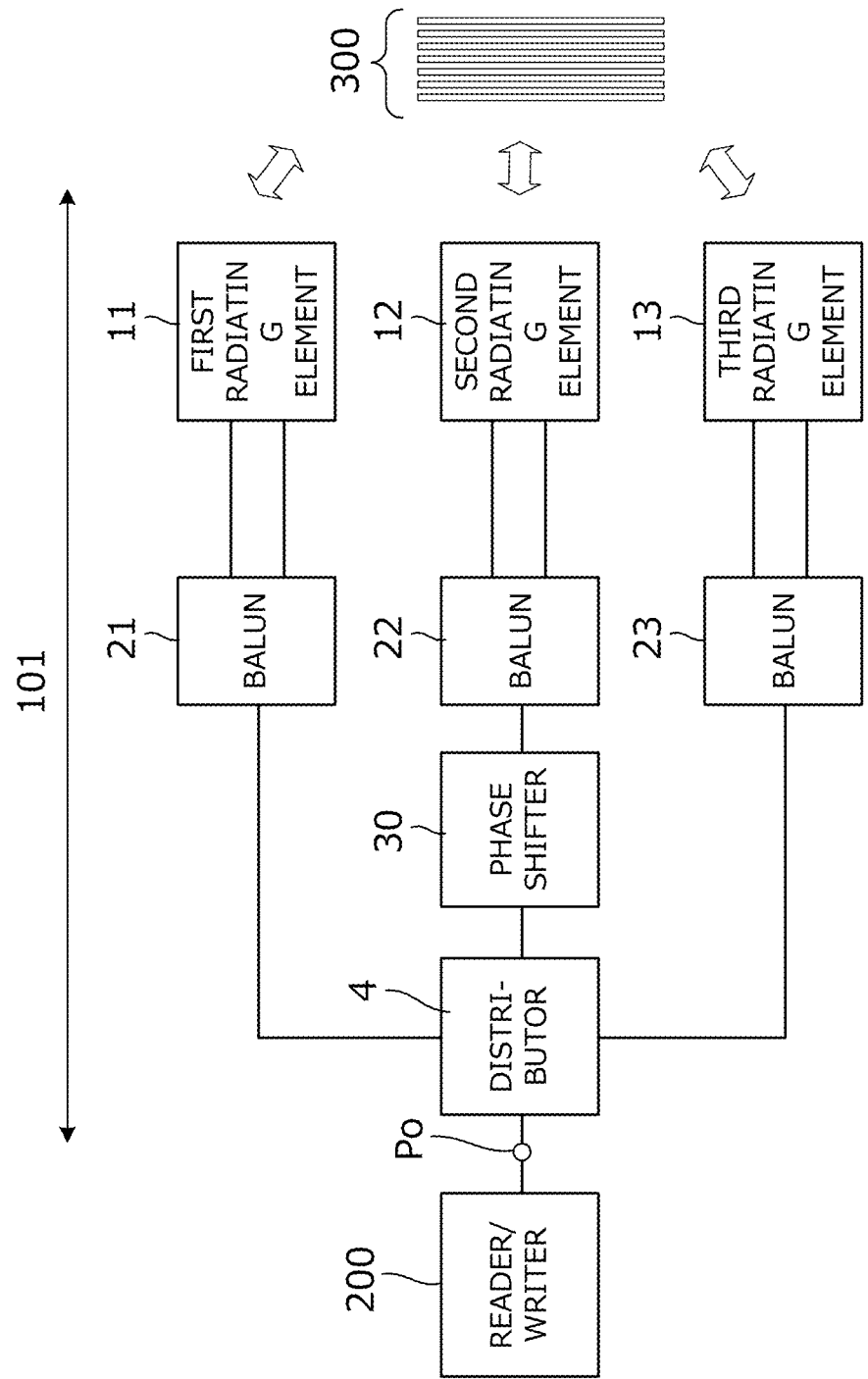
FIG. 1 is a block diagram illustrating a circuit configuration of an RFID reader/writer antenna device 101 according to a first exemplary embodiment.

Hereinafter, several specific exemplary embodiments will be given with reference to the drawings to describe a plurality of modes for carrying out the present invention. In the drawings, the same reference signs are assigned to the same portions. In consideration of the description of the main points or ease of understanding, the embodiment is divided into a plurality of exemplary embodiments for convenience of description, but partial replacement or combination of configurations described in different embodiments is possible as would be appreciated to one skilled in the art. In second and subsequent embodiments, descriptions of matters common to those in a first embodiment are omitted, and only different points will be described. In particular, the same operation effect by the same configuration will not be sequentially described for each embodiment.

First Exemplary Embodiment

FIG. 1 is a block diagram illustrating a circuit configuration of an RFID reader/writer antenna device 101 according to a first exemplary embodiment. The RFID reader/writer antenna device 101 includes a first radiating element 11, a second radiating element 12, a third radiating element 13, baluns 21, 22, and 23, a distributor 4, and a phase shifter 30. An RFID reader/writer 200 is connected to the RFID reader/writer antenna device 101. The baluns 21, 22, and 23 correspond to "balance-unbalance converters" according to the present disclosure.

The first radiating element 11, the second radiating element 12, and the third radiating element 13 are used, for example, for reading or writing of the RFID tags of stacked RFID tagged articles 300. According to the exemplary aspect, each of the first radiating element 11, the second radiating element 12, and the third radiating element 13 is a balanced feed type radiating element. Moreover, each of the baluns 21, 22, and 23 is a balance-unbalance conversion element. The distributor 4 connects the first radiating element 11, the second radiating element 12, and the third radiating element 13 to a common input/output portion Po. The phase shifter 30 causes the feeding phase of the second radiating element 12 and the feeding phases of the first radiating element 11 and the third radiating element 13 to have a phase difference of 90°. The phase shifter 30 includes a delay line constructed to delay a signal by a phase shift of approximately 90° (for example, 90° or 90°±10°).

Figure 2:
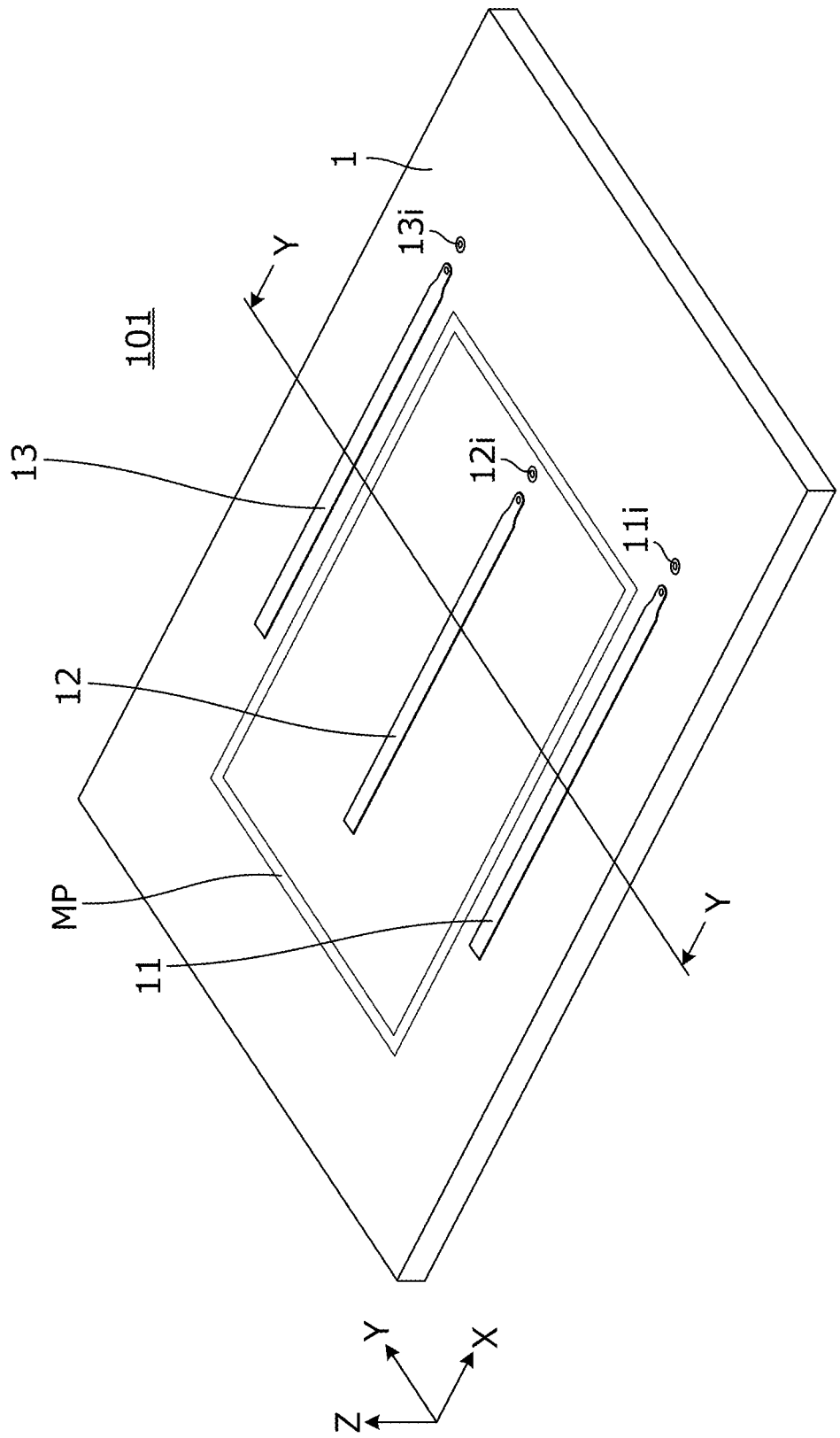
FIG. 2 is an external perspective view of the RFID reader/writer antenna device 101.
Figure 3:
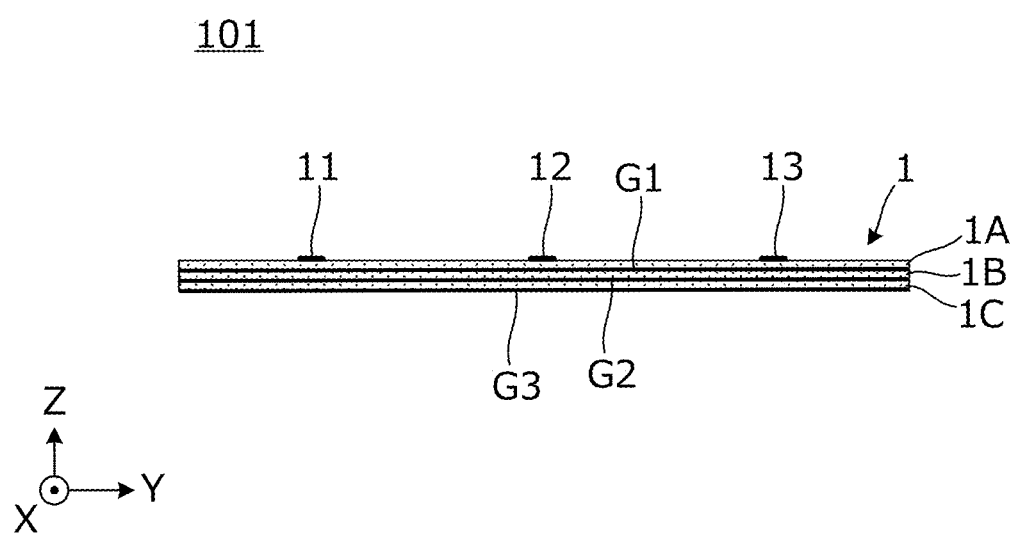
FIG. 3 is a cross-sectional view taken along line Y-Y in FIG. 2.

FIG. 2 is an external perspective view of the RFID reader/writer antenna device 101. FIG. 3 is a cross-sectional view taken along line Y-Y in FIG. 2. The RFID reader/writer antenna device 101 includes a rectangular plate-shaped substrate 1, and the first radiating element 11, the second radiating element 12, and the third radiating element 13 are formed on the upper surface of the substrate 1. Moreover, a rectangular article placement position guide MP is provided to guide a position for placing the RFID tagged article is displayed on the upper surface of the substrate 1. In an exemplary aspect, the article placement position guide MP is an insulator pattern. In a state where a plurality of RFID tagged articles are placed using the article placement position guide MP as a guide, the RFID reader/writer antenna device 101 is configured to perform reading and writing of the RFID tags.

Each of the first radiating element 11, the second radiating element 12, and the third radiating element 13 is a microstrip antenna, and constructed to perform fundamental wave resonance in a frequency band (for example, 860 MHz to 960 MHz) of UHF band RFID. Further, these radiating elements 11 and 11$i$, 12 and 12$i$, and 13 and 13$i$ are all radiating elements of microstrip antennas. That is, although the radiating elements are balanced feed type radiating elements, the radiating elements are microstrip antennas that appear to be substantially a single linear radiating element, but are fed at a feeding position biased to one side. In other words, the radiating elements are non-ground type (e.g., balance type) linear radiating elements. This is because, when an antenna (for example, an inverted-F antenna) or the like in which the radiating element is grounded to the ground conductor is used for the first radiating element 11, the second radiating element 12, and the third radiating element 13, a current flows between the radiating elements via the ground conductor due to a phase difference between the radiating elements, and isolation between the first radiating element 11 and the second radiating element 12, isolation between the second radiating element 12 and the third radiating element 13, and the like cannot be obtained.

Since the microstrip antenna is used in the exemplary embodiment, power can be supplied at a position shifted to the end portion of the radiating element as in an asymmetric dipole antenna, instead of supplying power at substantially the center portion of the entire length of the radiating element as in a general dipole antenna. FIG. 2 is a view in a case where the power feeding unit is designed to be substantially the end portion of the radiating element. Each element of the first radiating element 11, the second radiating element 12, and the third radiating element 13 has one end as an end portion of each pattern, and the radiating element (11$i$, 12$i$, 13$i$) by a through-hole electrode in the vicinity in an X direction is set as the other end of the microstrip antenna after passing through the feeding circuit. A specific circuit configuration of this portion will be described later.

As illustrated in FIG. 3, the substrate 1 is a stacked substrate of insulating base material layers 1A, 1B, and 1C. A ground conductor G1 is formed on substantially the entire upper surface of the base material layer 1B. A ground conductor G2 is formed on the upper surface of the base material layer 1C. A ground conductor G3 is formed on the lower surface of the base material layer 1C. Although not shown in the cross-sectional position illustrated in FIG. 3, a conductor pattern is formed between the base material layer 1B and the base material layer 1C, and a microstrip line is configured by the conductor pattern and the ground conductors G1 and G3.

Here, the description will be given to explain the advantage of providing the feeding phase of the second radiating element 12 and the feeding phase of the first radiating element 11 to have a phase difference of 90° or 90°±10°, and the feeding phase of the second radiating element 12 and the feeding phase of the third radiating element 13 to have a phase difference of 90° or 90°±10°.

In order to read RFID tags in a state where a plurality of RFID tagged articles 300 are stacked and placed immediately above the RFID reader/writer antenna device 101, it is necessary to (A) shift a NULL point by forming a plurality of propagation paths, (B) transmit energy required to simultaneously drive many RFID ICs, and (C) configure a transmission path in a mode of only an electric field (or a magnetic field) in a near field of the radiating element of the RFID tag and a near field of the radiating element (11, 12, 13) of the RFID reader/writer antenna device 101.

For example, when an electric field is emitted from one radiating element of the RFID reader/writer antenna device 101 to the first RFID tag and the second RFID tag, for example, the phase of the electric field reflected from the first RFID tag is inverted by 180 degrees, and thus the second RFID tag receives a composite wave of the electric field directly received from the reader/writer and the electric field reflected by the first RFID tag. A point at which the composite wave is canceled out is a NULL point. On the other hand, for example, in the communication between the RFID tag and the first radiating element 11, even in a case where a certain position of the RFID tag becomes a NULL point, and the RFID tag cannot be read, when the RFID tag and the second radiating element 12 can communicate with each other, the RFID reader/writer antenna device and the RFID tag can communicate with each other.

As described above, in the RFID reader/writer antenna device in which a plurality of transmission paths (i.e., a transmission path between the radiating element and the RFID tag) by the electric field (or the magnetic field) are configured, the NULL point generated by the transmission path between the first radiating element 11 and the radiating element of the RFID tag and the NULL point generated by the transmission path between the second radiating element 12 and the radiating element of the RFID tag can be made different from each other, and the NULL point is eliminated as a whole. Similarly, the above-described NULL points can be made different from the NULL point generated by the transmission path between the third radiating element 13 and the radiating element of the RFID tag, and the NULL point is eliminated as a whole. In this case, the transmission path between the first radiating element 11 and the radiating element of the RFID tag and the transmission path between the second radiating element 12 and the radiating element of the RFID tag need to be separate transmission paths, and the isolation between the first radiating element 11 and the second radiating element 12 is required. Similarly, the transmission path between the second radiating element 12 and the radiating element of the RFID tag and the transmission path between the third radiating element 13 and the radiating element of the RFID tag need to be separate transmission paths, and the isolation between the second radiating element 12 and the third radiating element 13 is required.

When many RFID tagged articles 300 are stacked and placed, large electromagnetic wave energy is required to simultaneously drive many RFID tag ICs. Therefore, it is also important to shorten the distances between the RFID tag and the first radiating element 11, the second radiating element 12, and the third radiating element 13.

When the distance between the RFID reader/writer antenna device 101 and the RFID tag is short, it leads to the action of a near field of the first radiating element 11, the second radiating element 12, and the third radiating element 13, and leads to the action of a near field of the radiating element of the RFID tag, and thus signal transmission is performed in a single mode using only an electric field (or a magnetic field).

In this embodiment, with the above configuration, the NULL point generated by the electromagnetic wave from one of the three radiating elements 11, 12, and 13 and the NULL point generated by the electromagnetic wave from the other radiating element are different in position, and the RFID tag at the position that becomes the NULL point in one radiating element can be read and written by the other radiating element.

Moreover, in this embodiment, the feeding phase of the first radiating element 11 and the feeding phase of the second radiating element 12 have a phase difference of approximately 90° or 90°±10°, and thus the phases of the first radiating element 11 and the second radiating element 12 are substantially orthogonal to each other. That is, at the moment when the electric field radiation from the first radiating element 11 is maximized, the electric field radiation from the second radiating element 12 is near zero (that is, a moment with no field emission or no field reception by the second radiating element 12 comes), and thus the electric field emitted from the first radiating element 11 cannot be transmitted and received by the second radiating element 12. Thus, the isolation between the first radiating element 11 and the second radiating element 12 is secured. Since the isolation is secured by the phase difference in this manner, even when the distance between the first radiating element 11 and the second radiating element 12 is shortened (for example, even when the distance is shortened to ¼ wavelength or less), the transmission paths between the RFID tag and the first radiating element 11 and between the RFID tag and the second radiating element 12 are separated, and the communication between the RFID tag and the first radiating element 11 and the communication between the RFID tag and the second radiating element 12 can be separated. The same configuration and technical effect applies to the relationship between the second radiating element 12 and the third radiating element 13.

Next, an example of a specific structure of the RFID reader/writer antenna device 101 will be described.

Figure 4:
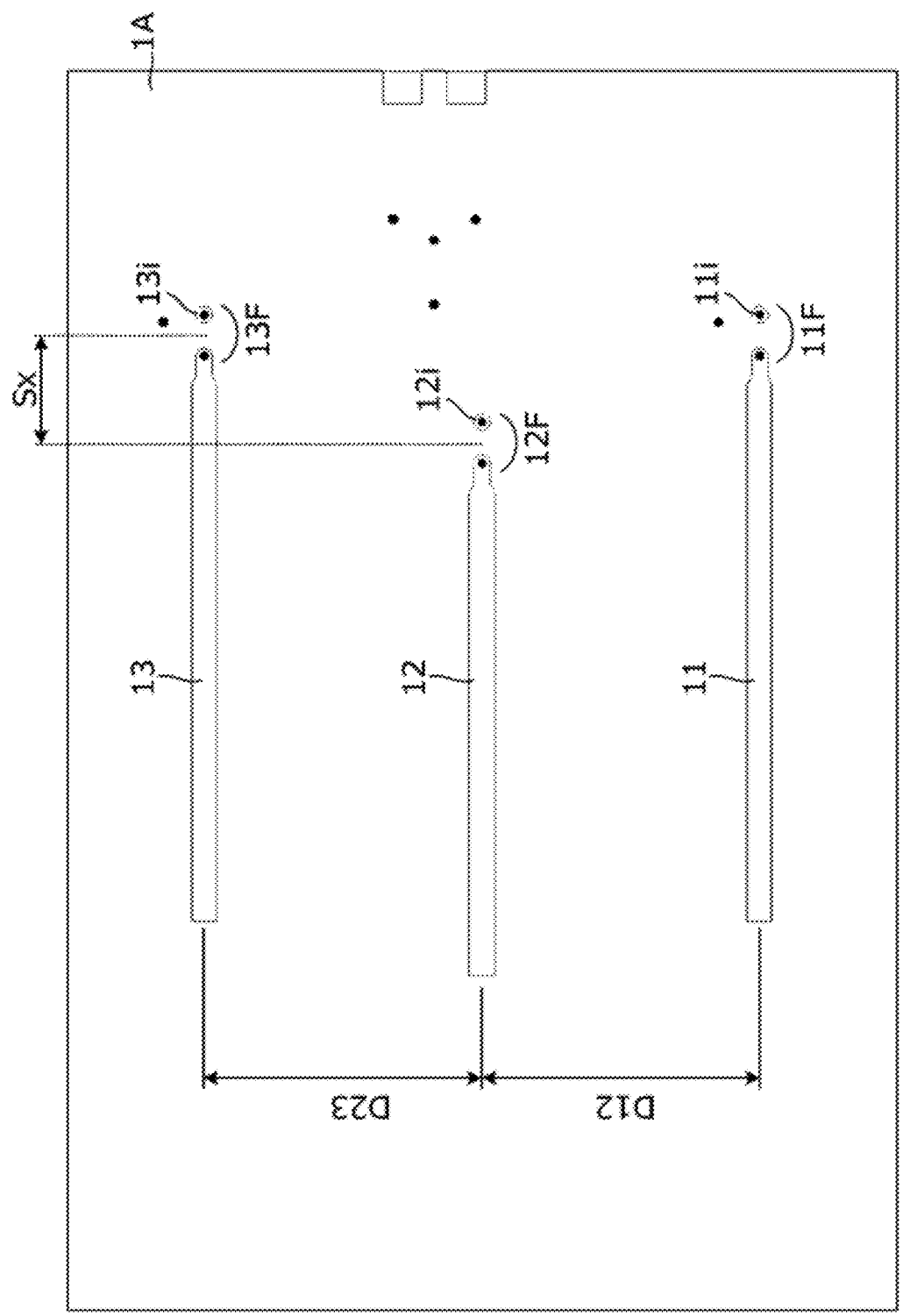
FIG. 4 is a plan view of a base material layer 1A.
Figure 5:
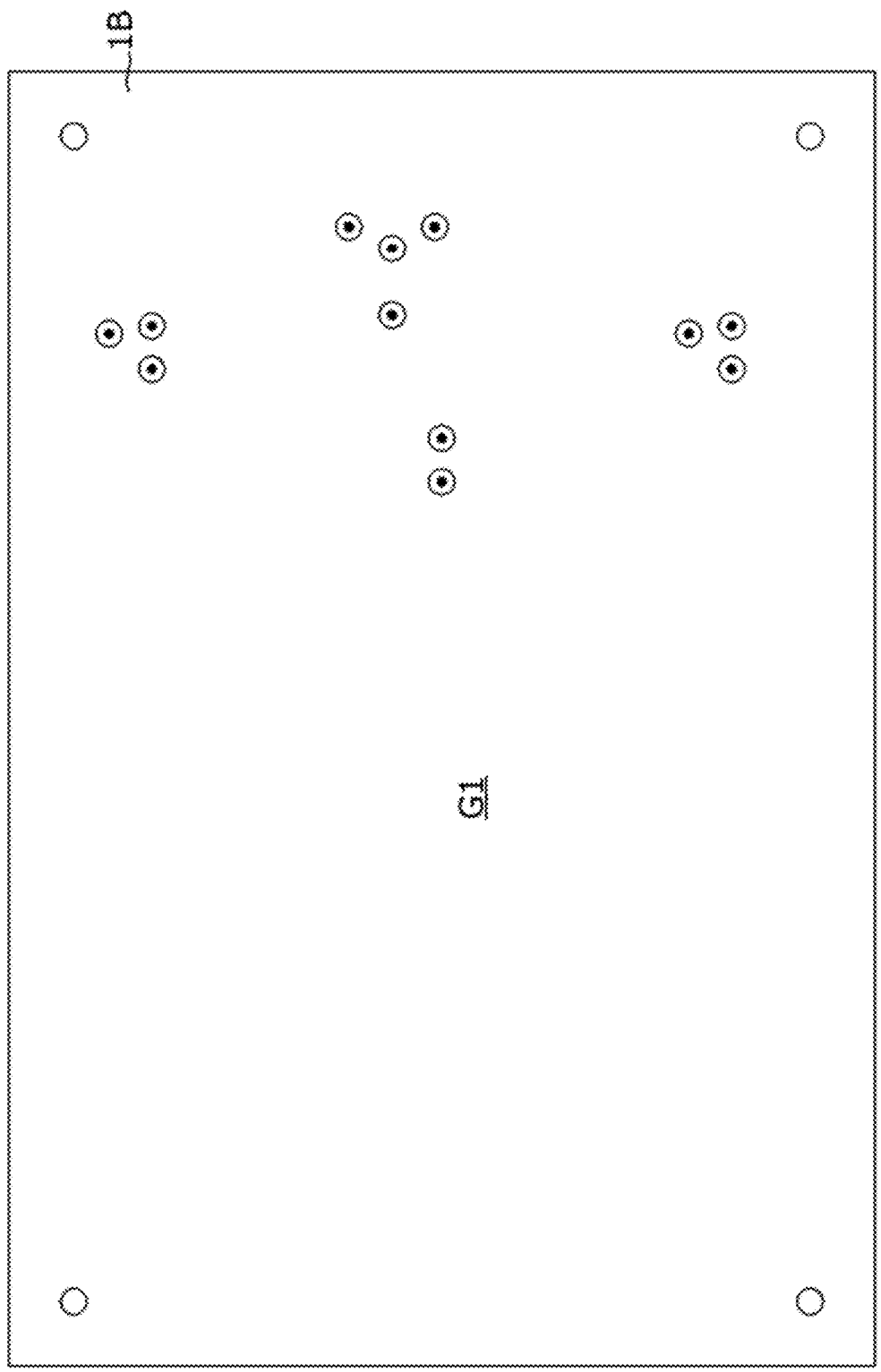
FIG. 5 is a plan view of a base material layer 1B.
Figure 6:
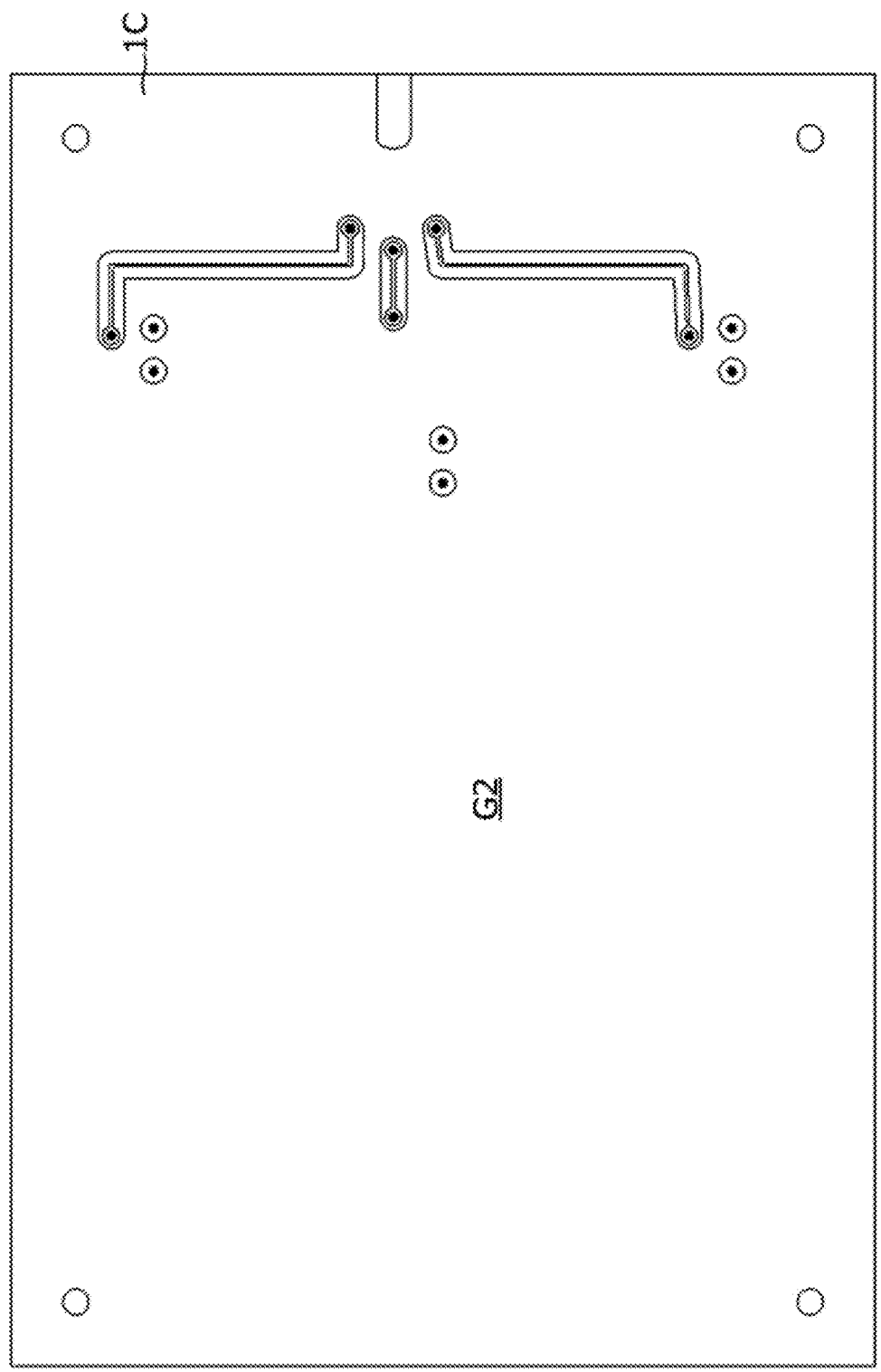
FIG. 6 is a plan view of a base material layer 1C.
Figure 6:
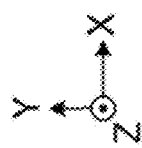
Figure 7:
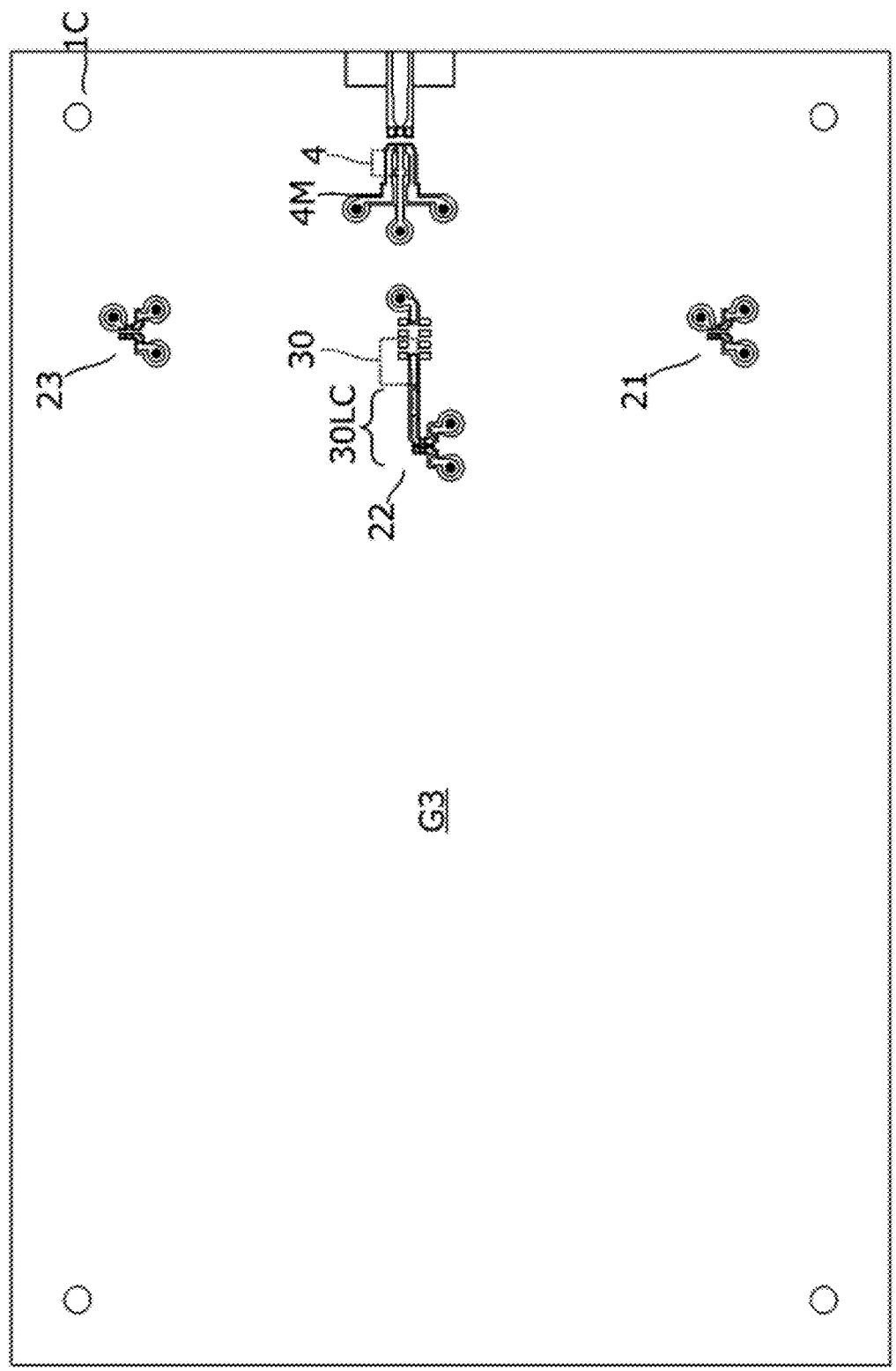
FIG. 7 is a plan view illustrating, in a transparent manner, conductor patterns formed and electronic components mounted on a lower surface of the base material layer 1C.

FIG. 4 is a plan view of the base material layer 1A, FIG. 5 is a plan view of the base material layer 1B, and FIG. 6 is a plan view of the base material layer 1C. FIG. 7 is also a plan view of the base material layer 1C, but illustrates, in a transparent manner, conductor patterns formed and electronic components mounted on the lower surface.

In FIGS. 4, 5, 6, and 7, a portion appearing as a round pattern is a via conductor, and is electrically connected to a conductor pattern of another layer.

In FIG. 4, each of the power feeding units 11F, 12F, and 13F is connected to a balun described later via a via conductor.

In FIG. 4, the first radiating element 11$i$, the second radiating element 12$i$, and the third radiating element 13$i$ are also indicated by reference signs. The first radiating elements 11 and 11$i$ configure a microstrip antenna using the power feeding unit 11F as a power feeding unit. However, in this example, since the first radiating element 11$i$ hardly extends linearly, the first radiating element 11 acts as a substantial radiating element. Further, the second radiating elements 12 and 12$i$ configure a microstrip antenna using the power feeding unit 12F as a power feeding unit. Similarly to the first radiating element 11$i$, since the second radiating element 12$i$ hardly extends linearly, the second radiating element 12 acts as a substantial radiating element. Similarly, the third radiating elements 13 and 13$i$ configure a microstrip antenna using the power feeding unit 13F as a power feeding unit. Similarly to the first radiating element 11$i$, since the third radiating element 13$i$ hardly extends linearly, the third radiating element 13 acts as a substantial radiating element.

Since the feeding point position of the microstrip antenna can be moved to the direction of the end portion of the antenna depending on the distance of the antenna from the ground conductor and the dielectric constant of the base material, the power feeding unit can also be moved to substantially the end portion of the radiating element as illustrated in FIG. 4. In this embodiment, reading and writing are performed in a state where the plurality of stacked RFID tagged articles are disposed close to the reader/writer antenna device, and thus transmission and reception are performed between the radiating element of the RFID tag and the reader/writer antenna device with the near field of the magnetic field (or electric field).

In this embodiment, by making the radiating elements 11$i$, 12$i$, and 13$i$ small so as not to emit almost any electromagnetic wave, the radiating element of the reader/writer antenna device emits an electromagnetic wave substantially only from one electric field maximum point (i.e., the open end of the radiating element) and one magnetic field maximum point (i.e., the feeding point of the radiating element). Therefore, only one coupling path of the magnetic field (or electric field) between one radiating element and the radiating element of the RFID tag is generated, and the radiating elements 11, 12, and 13 of the reader/writer antenna device and the radiating element of the RFID tag are coupled in a single mode of only the electric field (or the magnetic field).

As described above, the first radiating element 11, the second radiating element 12, and the third radiating element 13 are configured in linear conductor patterns of which the extending directions (the X direction) are parallel to each other. The line lengths of the first radiating element 11, the second radiating element 12, and the third radiating element 13 are lengths in which resonation with the fundamental wave in the used frequency band is generated.

Since there is a phase difference of $90°$ or $\pm 10°$ between the feeding phase of the second radiating element 12 and the feeding phases of the first radiating element 11 and the third radiating element 13, respectively, on the line of each radiating element, a point at the moment of the maximum electric field of the second radiating element 12 corresponds to a point at the moment of the zero electric field of the first radiating element 11 and a point at the moment of the zero electric field of the third radiating element 13, and a point at the moment of the maximum magnetic field of the second radiating element 12 corresponds to a point at the moment of the zero magnetic field of the first radiating element 11 and a point at the moment of the zero magnetic field of the third radiating element 13.

As further shown in FIG. 4, an interval (e.g., a first interval) D12 between the second radiating element 12 and the first radiating element 11 may be equal to an interval (e.g., a second interval) D23 between the second radiating element 12 and the third radiating element 13. When the first interval and the second interval are different, the lengths of the transmission paths between the radiating element of the RFID tag and the radiating elements 11, 12, and 13 of the reader/writer antenna device are different, so that the position of the NULL point is shifted (shifted as compared with the case of D12=D23), and thus a probability that the RFID tag cannot be read is further reduced. Further, the position of the NULL point can be shifted by placing the RFID tag, for example, between the first radiating element 11 and the second radiating element 12 without placing the RFID tag directly above the second radiating element 12.

Incidentally, as apparent from FIG. 4, the power feeding unit 12F of the second radiating element 12 and the power feeding unit 11F of the first radiating element 11 are shifted by a distance Sx in the extending direction (i.e., the X direction) of the first radiating element 11 and the second radiating element 12. This configuration is to shift the position of the electric field maximum point or the magnetic field maximum point of each of the radiating elements 11, 12, and 13 (in the X direction) from the position for placing the RFID tagged article. In this way, by making the positions of the radiating elements different in the X direction, a plurality of distances from the radiating elements 11, 12, and 13 to the respective RFID tags are generated also in the X direction, and the generation positions of the NULL point in the X direction are different in a case where the radiating elements 11, 12, and 13 perform communication alone.

Moreover, the line length of the second radiating element 12 is shorter than the line lengths of the first radiating element 11 and the third radiating element 13. This configuration is to compensate for the dielectric constant of the dielectric in the vicinity of the second radiating element 12 being higher than the dielectric constant of the dielectric in the vicinity of the first radiating element 11 and the vicinity of the third radiating element 13 in a state where the RFID tagged articles 300 are stacked and placed. That is, since the base material (for example, polyethylene terephthalate (PET)) of the RFID tagged article 300 is close to the second radiating element 12, the second radiating element 12 is made shorter than the first radiating element 11 and the third radiating element 13 in advance in consideration of the wavelength shortening effect due to the dielectric constant.

As illustrated in FIG. 7, the baluns 21, 22, and 23 and the phase shifter 30 are mounted on the lower surface (e.g., the lower surface of the substrate 1) of the base material layer 1C. An LC circuit 30LC for fine phase adjustment using a conductor pattern is formed between the phase shifter 30 and the balun 22. That is, the LC circuit 30LC for fine phase adjustment is connected to the phase shifter 30 in series. Further, an impedance matching circuit 4M using a conductor pattern is formed on a line of a distribution destination of the distributor 4.

Figure 8:
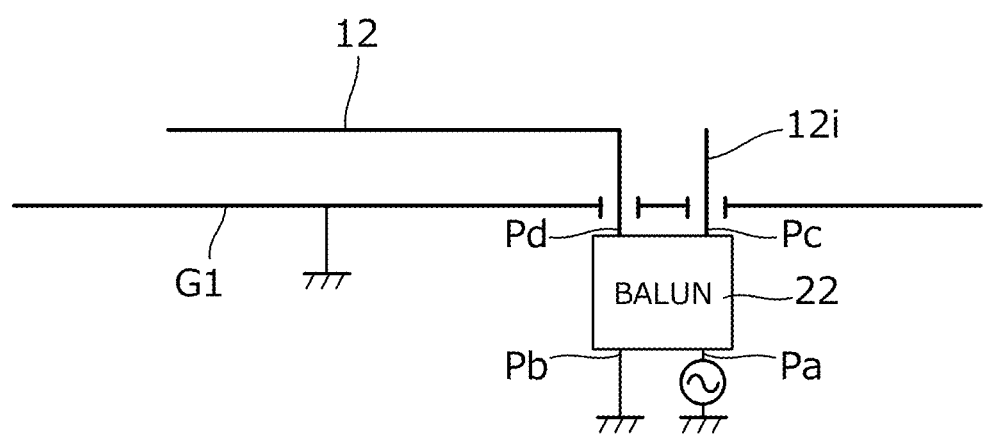
FIG. 8 is a partial circuit diagram of the RFID reader/writer antenna device.

FIG. 8 is a partial circuit diagram of the RFID reader/writer antenna device. The second radiating element 12 is disposed above the ground conductor G1 in parallel with the surface of the ground conductor G1, and one end thereof is connected with one port Pd of the balance output ports of the balun 22. As further shown, the second radiating element 12i is connected to another port Pc of the balance output ports of the balun 22. In operation, power is supplied from one port Pa of the balance input ports of the balun 22, and another port Pb is grounded to the ground conductor. The same configuration applies to the feeding circuit for the first radiating element 11 and the feeding circuit for the third radiating element 13.

When power is supplied between the second radiating elements 12 and 12i disposed above the ground conductor G1 through the balun, the second radiating elements 12 and 12i float from the ground conductor. Therefore, since a current path between the second radiating element 12 and the first radiating element 11 and a current path between the second radiating element 12 and the third radiating element 13 are not generated in the ground conductor, isolation between the radiating elements is high, and the isolation can be maintained even if the distance between the radiating elements is shortened. As a result, even when the distance between the radiating elements is shortened, and the distance between the radiating element of the RFID tag and each of the radiating elements 11, 12, and 13 is shortened, independent transmission paths can be maintained, so that communication can be performed between the RFID tag and the three radiating elements 11, 12, and 13.

Figure 9:
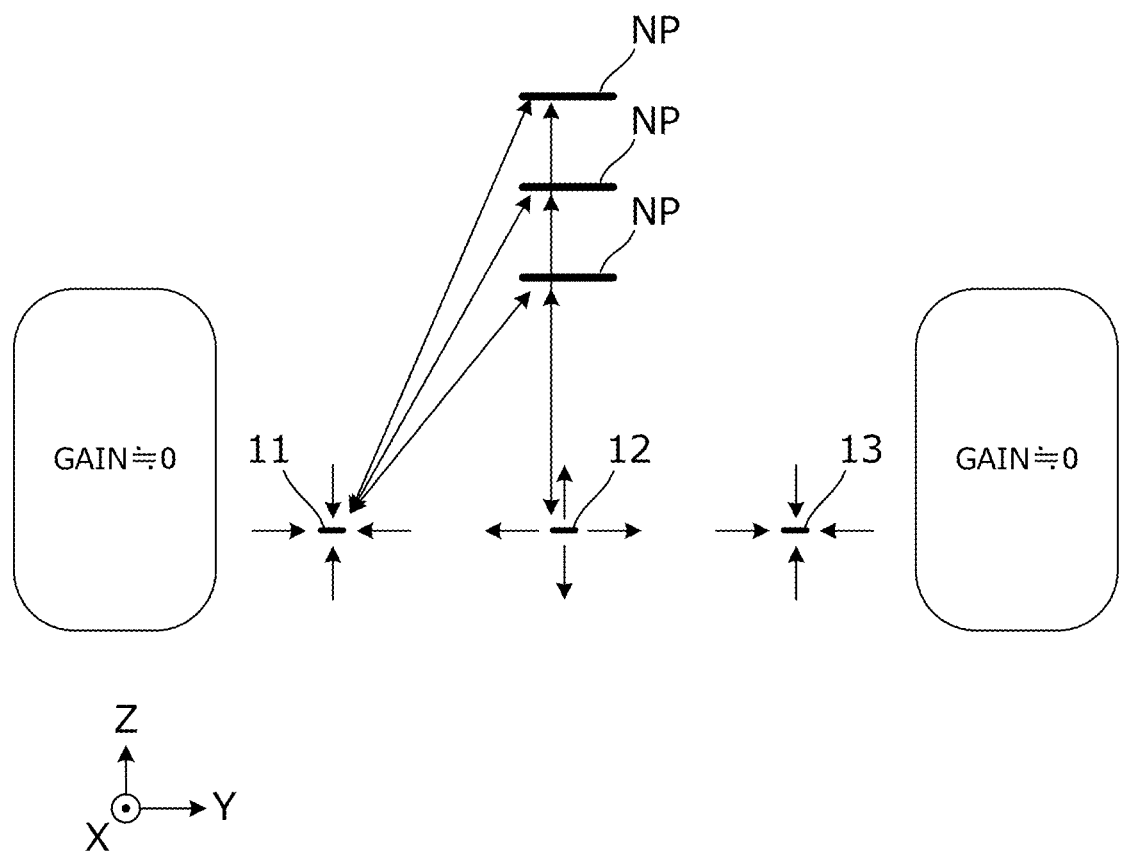
FIG. 9 is a diagram illustrating an action of generating directivity on a Y-Z plane by three radiating elements 11, 12, and 13.

FIG. 9 is a diagram illustrating an action of generating directivity on a Y-Z plane by the three radiating elements 11, 12, and 13. Arrows surrounding each of the three radiating elements 11, 12, and 13 indicate the direction of the electric field at a certain time point. Since there is a phase difference of $90°$ between the feeding phase of the second radiating element 12 and the feeding phases of the first radiating element 11 and the third radiating element 13, there are portions where the magnitudes of the electric fields are opposite to each other. In the direction (i.e., the Y direction) in which the three radiating elements 11, 12, and 13 are arranged, electric fields having an opposite magnitude relationship are combined, and thus a gain in this direction is substantially zero. On the other hand, in the Z direction, the magnitudes of the electric fields are not exactly opposite, and a gain is generated.

In FIG. 9, the electric field generated by the second radiating element 12 and the electric field generated by the first radiating element 11 cancel each other at a portion such that the difference between its distance from the second radiating element 12 and its distance from the first radiating element 11 is a ½ wavelength. This portion is a NULL point NP. As the distance between the first radiating element 11 and the second radiating element 12 becomes shorter, the distance at which the ½ wavelength difference occurs in the Z direction becomes longer, and the range in the Z direction in which the RFID tag can read without the occurrence of the NULL point becomes wider.

Figure 10:
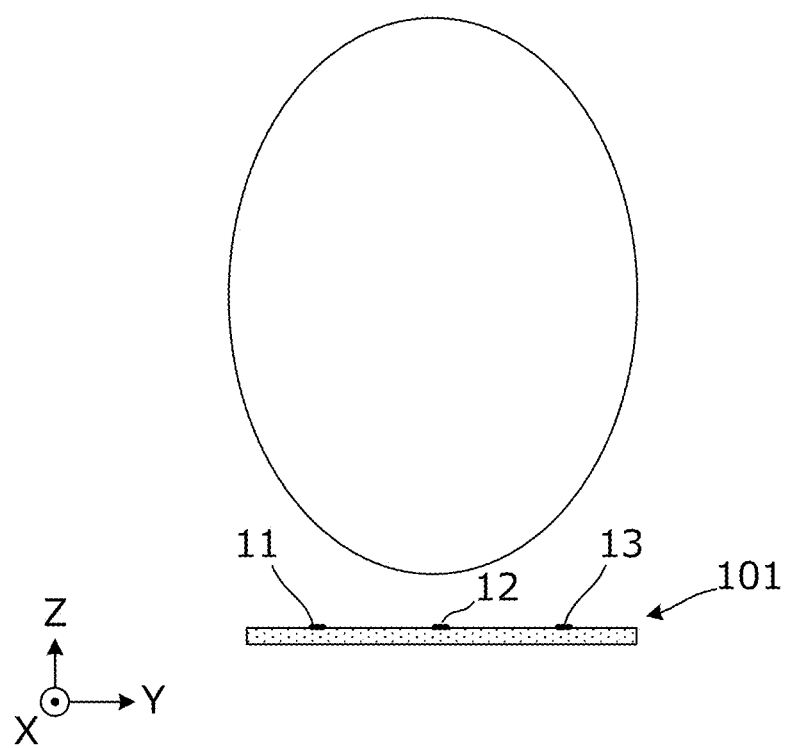
FIG. 10 is a diagram illustrating directivity of the RFID reader/writer antenna device 101.

FIG. 10 is a diagram illustrating directivity of the RFID reader/writer antenna device 101. Here, a cross section in a plane (e.g., an E plane) parallel to the electric field vector is illustrated.

As described above, in the RFID reader/writer antenna device 101, the first radiating element 11, the second radiating element 12, and the third radiating element 13 are linear conductor patterns, and the extending directions thereof are the X direction and are parallel to each other, so that directivity on the Y-Z plane has a pattern with a narrow width in the Y direction. Therefore, without performing reading and writing on the RFID tag on the Y-direction side of the RFID reader/writer antenna device 101, accurate reading and writing can be performed on a target RFID tag.

According to this embodiment, when a plurality of RFID tagged articles are stacked on the upper surface of the second radiating element 12 at the center, the distance from the first radiating element 11 or the third radiating element 13 on both sides to each RFID tag is short (substantially the same as the distance from the second radiating element 12 to each RFID tag), so that even in communication between the first radiating element 11 or the third radiating element 13 on both sides and each RFID tag, a signal can be propagated under a low loss.

According to this embodiment, there is a case where the RFID tag is disposed, for example, between the first radiating element 11 and the second radiating element 12 without being placed immediately above the second radiating element 12. However, even in this case, the distance from the third radiating element 13 to each RFID tag is short in a state where a plurality of RFID tagged articles are stacked, and thus a signal can be propagated under a low loss even in communication between the third radiating element 13 and each RFID tag.

As described above, according to this embodiment, the plurality of radiating elements 11, 12, and 13 are provided, and the number of the distances from the radiating elements 11, 12, and 13 to the RFID tags are plural. Thus, the occurrence positions of the NULL point when the radiating elements 11, 12, and 13 perform communication alone are different from each other. Therefore, by combining the communication signals of the plurality of radiating elements, the NULL point is substantially canceled out or otherwise eliminated. For example, an RFID tag that cannot be read by the second radiating element 12 at the center can otherwise be read by the first radiating element 11 or the third radiating element 13 on both sides. Further, conversely, for example, an RFID tag that cannot be read by the first radiating element 11 and the third radiating element 13 can otherwise be read by the second radiating element 12 at the center.

In this embodiment, with the above-described configuration, the feeding phase of the second radiating element 12 at the center and the feeding phases of the first radiating element 11 and the third radiating element 13 on both sides are shifted by approximately 90°. That is, the phases of electromagnetic field changes of the second radiating element 12, and the first radiating element 11 and the third radiating element 13 are orthogonal to each other. As a result, the isolation between the second radiating element 12 and the first radiating element 11 and the isolation between the second radiating element 12 and the third radiating element 13 are secured.

With the above structure, even when the interval D12 between the second radiating element 12 and the first radiating element 11 and the interval D23 between the second radiating element 12 and the third radiating element 13 illustrated in FIG. 4 are reduced, the isolation is secured and maintained. Therefore, it is not necessary to increase the intervals D12 and D23 only to secure the isolation, and the degree of freedom and flexibility in arrangement of the first radiating element 11, the second radiating element 12, and the third radiating element 13 is high.

In this embodiment, since the radiating elements 11, 12, and 13 are balanced feeding radiating elements, and all of them float from a ground potential, the electromagnetic fields generated in the radiating elements 11, 12, and 13 are not unnecessarily coupled via the ground conductor, whereby the isolation between the radiating elements 11, 12, and 13 is secured.

Second Exemplary Embodiment

In a second embodiment, an RFID reader/writer antenna device including a radiating element the type of which is different from that of the first embodiment will be described.

Figure 11:
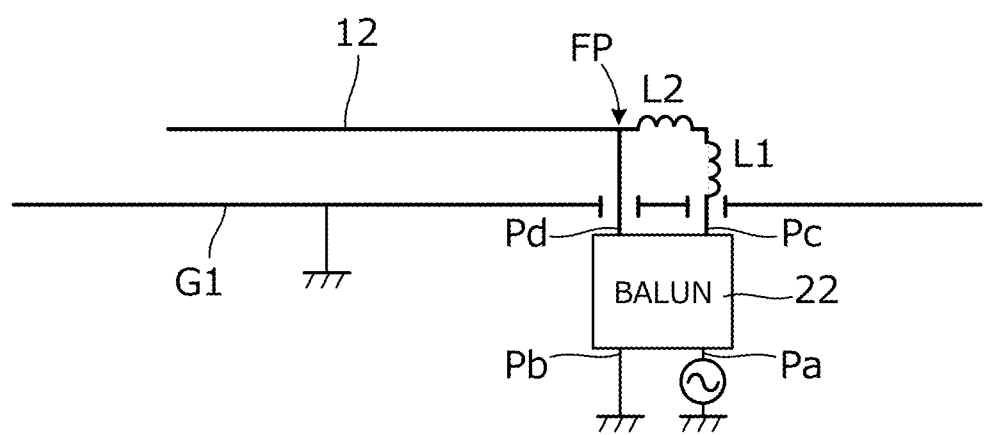
FIG. 11 is a partial circuit diagram of an RFID reader/writer antenna device according to a second exemplary embodiment.

FIG. 11 is a partial circuit diagram of an RFID reader/writer antenna device according to the second embodiment. As shown, the second radiating element 12 is disposed above the ground conductor G1 so as to be parallel to the surface of the ground conductor G1, and inductors L1 and L2 are connected to one end of the second radiating element 12. These inductors L1 and L2 are made, for example, of a conductor pattern. The end portion of the second radiating element 12 via the inductors L1 and L2 is connected to one port Pc of the balance output ports of the balun 22. Another port Pd of the balance output ports of the balun 22 is connected to the feeding point FP of the second radiating element 12. Power is supplied from one port Pa of the balance input ports of the balun 22, and another port Pb is grounded. In this manner, the second radiating element 12 configures an inverted-F antenna.

The configurations of the first radiating element 11 and the third radiating element 13 also form inverted-F antennas similarly to the second radiating element 12.

The arrangement relationship between the second radiating element 12, and the first radiating element 11 and the third radiating element 13 is basically the same as that in the example described in the first embodiment. As illustrated in this embodiment, each radiating element may configure an inverted-F antenna.

Third Exemplary Embodiment

In a third embodiment, an example in which a circuit configuration of phase control for each radiating element is different from that described in the first embodiment will be described.

Figure 12:
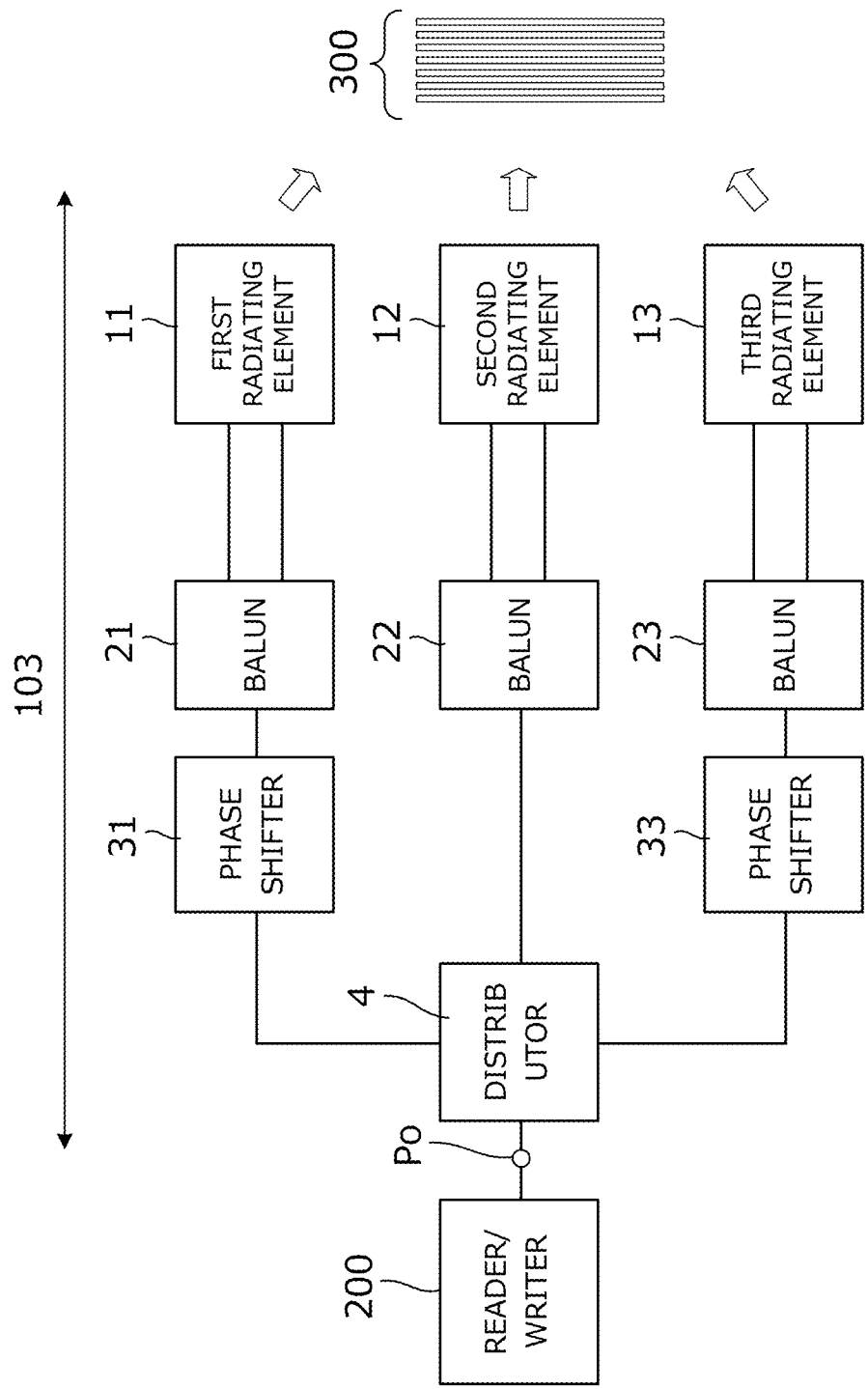
FIG. 12 is a circuit diagram of an RFID reader/writer antenna device 103 according to a third exemplary embodiment.

FIG. 12 is a circuit diagram of an RFID reader/writer antenna device 103 according to the third embodiment. As shown, the RFID reader/writer antenna device 103 includes the first radiating element 11, the second radiating element 12, the third radiating element 13, the baluns 21, 22, and 23, the distributor 4, and phase shifters 31 and 33. The RFID reader/writer 200 is connected to the RFID reader/writer antenna device 103.

Unlike the example illustrated in FIG. 1, a phase shifter is not connected between the balun 22 and the distributor 4. Instead, the phase shifter 31 is connected between the balun 21 and the distributor 4, and the phase shifter 33 is connected between the balun 23 and the distributor 4. Each of the phase shifters 31 and 33 is configured by, for example, a delay line that is constructed to generate a phase difference of approximately 90° (90° or ±10°) between input and output.

Also in the third embodiment, the feeding phase difference between the first radiating element 11 and the third radiating element 13 with respect to the second radiating element 12 is approximately 90°, and thus the same operation and effect as those of the RFID reader/writer antenna device described in the first embodiment can be obtained.

Fourth Exemplary Embodiment

In a fourth embodiment, an example in which the number of radiating elements is different from that described in the first embodiment will be described.

Figure 13:
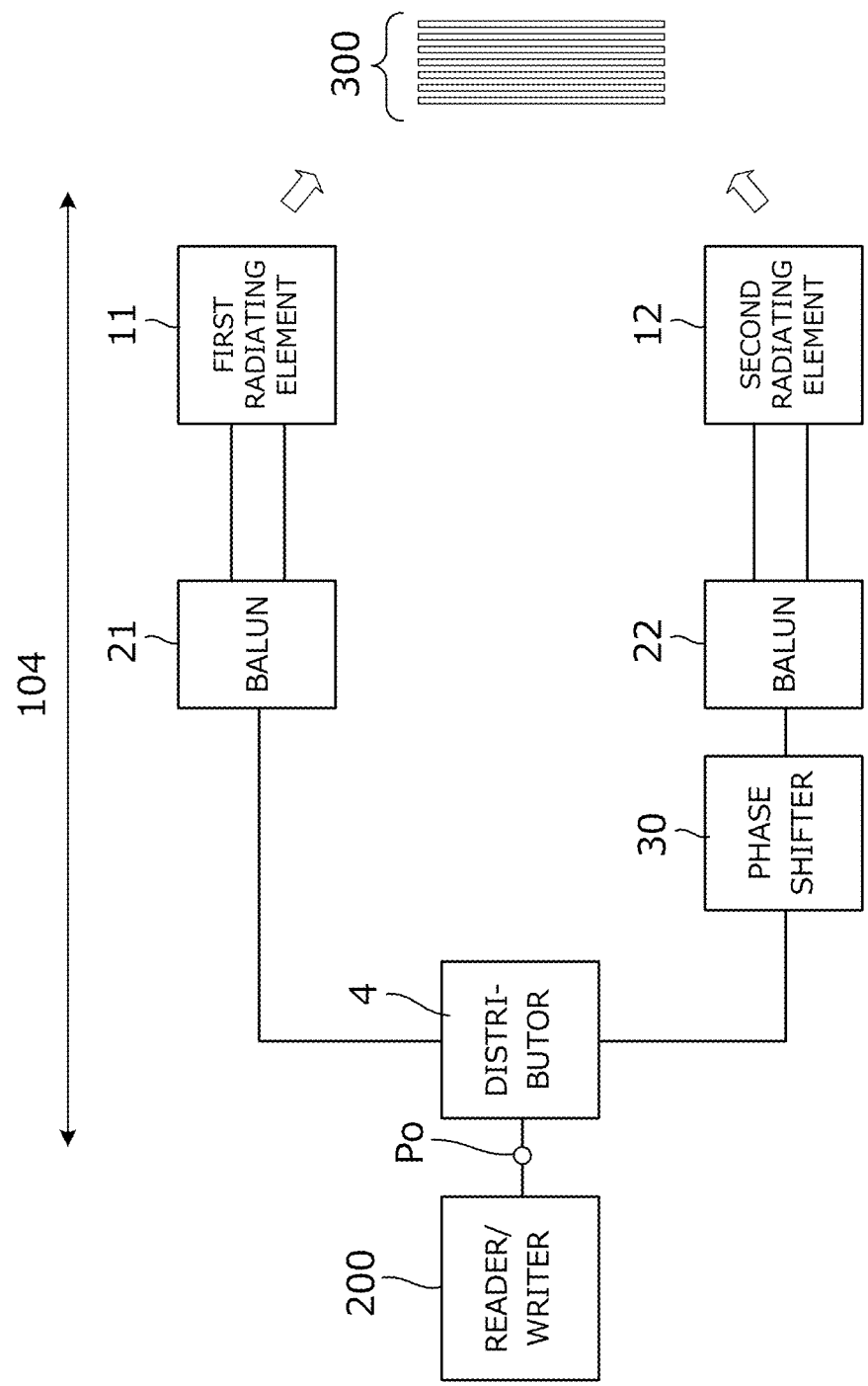
FIG. 13 is a circuit diagram of an RFID reader/writer antenna device 104 according to a fourth exemplary embodiment.

FIG. 13 is a circuit diagram of an RFID reader/writer antenna device 104 according to the fourth embodiment. The RFID reader/writer antenna device 104 includes the first radiating element 11, the second radiating element 12, the baluns 21 and 22, the distributor 4, and the phase shifter 30. The RFID reader/writer 200 is connected to the RFID reader/writer antenna device 104. Other configurations are similar to those of the RFID reader/writer antenna device described in the first embodiment.

Unlike the example illustrated in FIG. 1, the RFID reader/writer antenna device 104 according to the fourth embodiment does not include the third radiating element 13 and the balun 23. As described above, by only providing the two radiating elements 11 and 12, it is possible to obtain an effect of reducing the possibility of occurrence of a NULL point. That is, according to this embodiment, there are a plurality of distances from the radiating elements 11 and 12 to each RFID tag, and thus the occurrence positions of the NULL point when the radiating elements 11 and 12 perform communication alone are different from each other. Therefore, by combining the communication signals of the two radiating elements 11 and 12, the NULL point as the comprehensive characteristic is substantially canceled out.

Fifth Exemplary Embodiment

In a fifth embodiment, an RFID reader/writer antenna device including a radiating element having a conductor pattern different from that of the first exemplary embodiment will be described.

Figure 14:
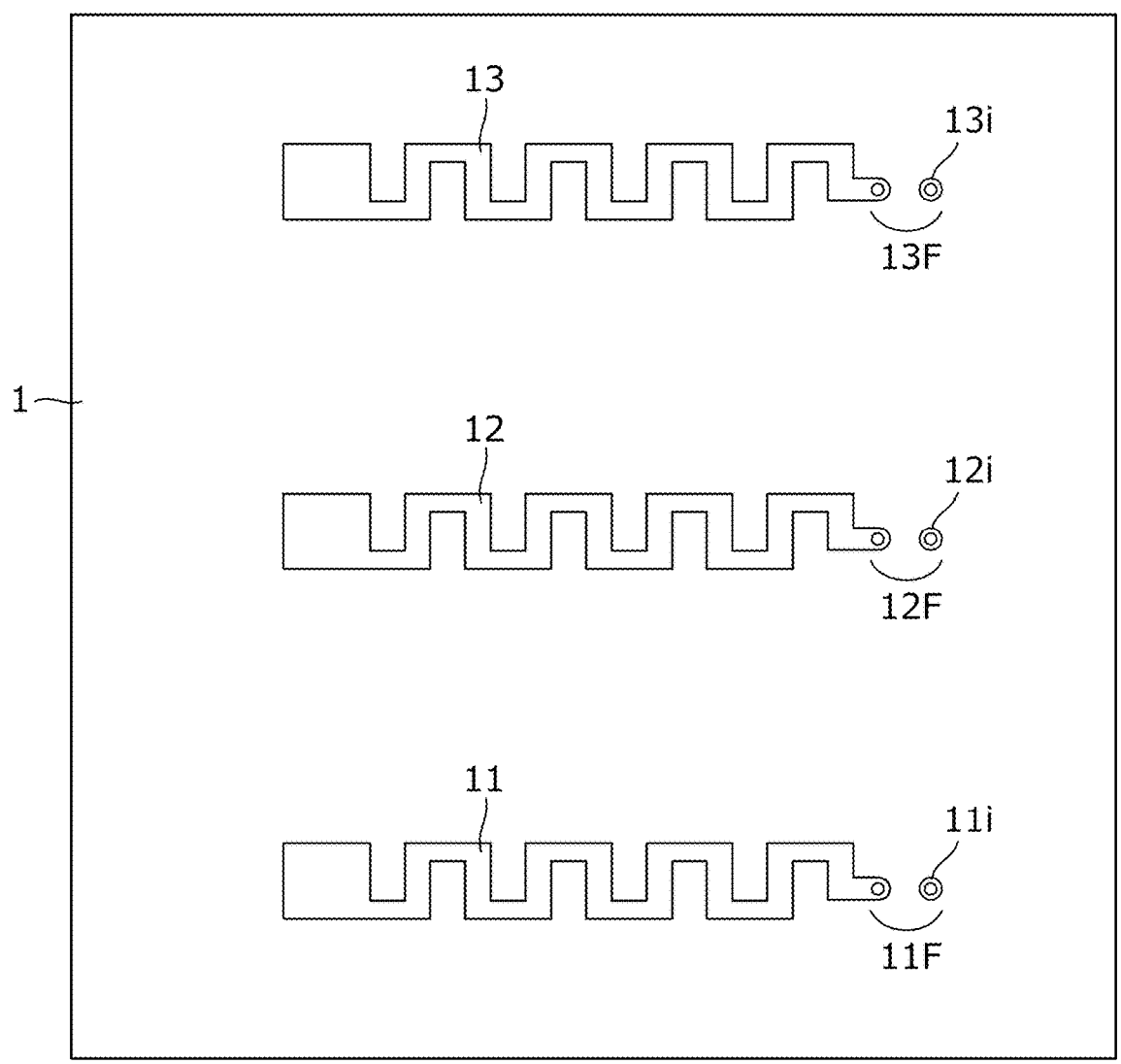
FIG. 14 is a plan view of an RFID reader/writer antenna device 105 according to a fifth exemplary embodiment.

FIG. 14 is a plan view of an RFID reader/writer antenna device 105 according to the fifth embodiment.

In FIG. 14, the first radiating elements 11 and 11i are microstrip antennas using the power feeding unit 11F as a power feeding unit, the second radiating elements 12 and 12i are microstrip antennas using the power feeding unit 12F as a power feeding unit, and the third radiating elements 13 and 13i are microstrip antennas using the power feeding unit 13F as a power feeding unit. Each of the first radiating element 11, the second radiating element 12, and the third radiating element 13 has a meander line shape instead of a linear shape according to the embodiments described above. That is, the first radiating element 11, the second radiating element 12, and the third radiating element 13 have a meander line shaped conductor pattern in which the X direction is an extending direction, and the extending directions are parallel to each other.

As illustrated in this embodiment, each of the radiating elements 11, 12, and 13 may not be a straight conductor pattern. According to this embodiment, since each of the radiating elements 11, 12, and 13 has a meander line shape, the dimension in the X direction can be shortened.

Finally, the description of the above embodiments is illustrative in all respects and not restrictive. Modifications and changes can be made as appropriate by those skilled in the art.

For example, in the example described above, all of the first radiating element 11, the second radiating element 12, and the third radiating element 13 resonate with the fundamental wave in the used frequency band. However, the line lengths of the first radiating element 11, the second radiating element 12, and the third radiating element 13 may be lengths in which resonation with harmonics in the used frequency band is generated.

REFERENCE SIGNS LIST

FP feeding point
G1, G2, G3 ground conductor
L1, L2 inductor
MP article placement position guide
Pa, Pb, Pc, Pd port
Po input/output portion
1 substrate
1A, 1B, 1C base material layer
4 distributor
4M impedance matching circuit
11, 11i first radiating element
11F power feeding unit
12, 12i second radiating element
12F power feeding unit
13, 13i third radiating element
13F power feeding unit
21, 22, 23 balun (balance-unbalance converter)
30, 31, 33 phase shifter
30LC LC circuit for fine phase adjustment
101, 103, 104, 105 RFID reader/writer antenna device
200 RFID reader/writer
300 RFID tagged article

The invention claimed is:

1. An RFID reader/writer antenna device comprising:
a plurality of radiating elements that are balanced feeding radiating elements and that include at least a first radiating element and a second radiating element, with the plurality of radiating elements each comprising conductor patterns that extend in directions parallel to each other and that are constructed for reading or writing of RFID tags;
a distributor that connects the first radiating element and the second radiating element to a common input/output;
balance-unbalance converters connected between the distributor and the plurality of radiating elements, respectively; and
a phase shifter configured to cause a feeding phase of the second radiating element and a feeding phase of the first radiating element to have a phase difference of 90° or 90°±10° with respect to each other.

2. The RFID reader/writer antenna device as claimed in claim 1, wherein the plurality of radiating elements include a third radiating element that comprises a conductor pattern extending in a direction parallel to each of the first and second radiating elements.

3. The RFID reader/writer antenna device as claimed in claim 2, wherein an interval between the second radiating element and the first radiating element in a direction perpendicular to the direction in which the radiating elements extend is equal to an interval between the second radiating element and the third radiating element in the direction perpendicular to the direction in which the radiating elements extend.

4. The RFID reader/writer antenna device as claimed in claim 2, wherein the second radiating element is disposed at a center, and the first radiating element and the third radiating element are disposed on opposing sides of the second radiating element.

5. The RFID reader/writer antenna device as claimed in claim 4, wherein the phase shifter is configured to cause the feeding phase of the second radiating element and feeding phases of the first radiating element and the third radiating element to have a phase difference of 90° with respect to each other.

6. The RFID reader/writer antenna device as claimed in claim 1, wherein the balance-unbalance converters are baluns, with a first balun disposed between the first radiating element and the distributor and a second balun disposed between the second radiating element and the phase shifter.

7. The RFID reader/writer antenna device as claimed in claim 6, wherein each of the plurality of radiating elements comprises a microstrip antenna with an end portion of the conductor pattern as a first end thereof and a through-hole electrode as a second end thereof.

8. The RFID reader/writer antenna device as claimed in claim 7, wherein the first end of the second radiating element is connected to a first port of the second balun and a second end of the second radiating element is connected to a second port of the second balun.

9. The RFID reader/writer antenna device as claimed in claim 6, further comprising at least one inductor that connects an end portion of the second radiating element to a first port of the second balun, with a second port of the second balun being connected to a feeding point of the second radiating element.

10. The RFID reader/writer antenna device as claimed in claim 1, wherein each of the first and second radiating elements comprises power feeding units that are shifted from each other in extending directions of the first radiating element and the second radiating element, respectively.

11. The RFID reader/writer antenna device as claimed in claim 1, wherein each of the plurality of radiating elements comprises a microstrip antenna with an end portion of the conductor pattern as a first end thereof and a through-hole electrode as a second end thereof.

12. The RFID reader/writer antenna device as claimed in claim 1, wherein the conductor pattern of each of the plurality of radiating elements comprises a linear conductor pattern extending in the directions parallel to each other.

13. An RFID reader/writer antenna device comprising:
a plurality of radiating elements that include at least a first radiating element and a second radiating element, with the plurality of radiating elements each comprising conductor patterns that extend in directions parallel to each other and that are constructed for reading or writing of RFID tags;
a distributor that connects the first radiating element and the second radiating element to a common input/output; and
a phase shifter configured to cause a feeding phase of the second radiating element and a feeding phase of the first radiating element to have a phase difference of 90° or 90°±10° with respect to each other,
wherein the conductor pattern of each of the plurality of radiating elements comprises a linear conductor pattern extending in the directions parallel to each other, and
wherein the second radiating element has a line length that is shorter than a line length of the first radiating element.

14. The RFID reader/writer antenna device as claimed in claim 13, wherein the line length of the second radiating element is constructed to compensate for a dielectric constant of a dielectric adjacent to the second radiating element.

15. The RFID reader/writer antenna device as claimed in claim 1, wherein each of conductor patterns of the plurality of radiating elements comprises a meander shape that extends in the directions parallel to each other.

16. An RFID reader/writer antenna device comprising:
a plurality of radiating elements each including respective conductor patterns that extend in a direction parallel to each other and that are constructed for reading or writing of RFID tags;
a distributor that connects the plurality of radiating elements to a common input/output;
a plurality of balance-unbalance converters connected between the plurality of radiating elements and the distributor, respectively; and
a phase shifter connected between one of the balance-unbalance converters and the distributor, with the phase shifter generating a phase difference of 90° or 90°±10° between a feeding phase of the respective radiating element and an adjacent radiating element of the plurality of radiating elements.

17. The RFID reader/writer antenna device as claimed in claim 16, wherein the plurality of radiating elements comprise respective power feeding units that are shifted from each other in the direction in which the conductor patterns extend.

18. The RFID reader/writer antenna device as claimed in claim 16, wherein respective intervals between each pair of radiating elements of the plurality of radiating elements in a direction perpendicular to the direction in which the radiating elements extend are equal to one another.

19. The RFID reader/writer antenna device as claimed in claim 16, wherein each of the plurality of radiating elements comprises a microstrip antenna with an end portion of the conductor pattern as a first end thereof and a through-hole electrode as a second end thereof.

* * * * *